Patented July 27, 1926.

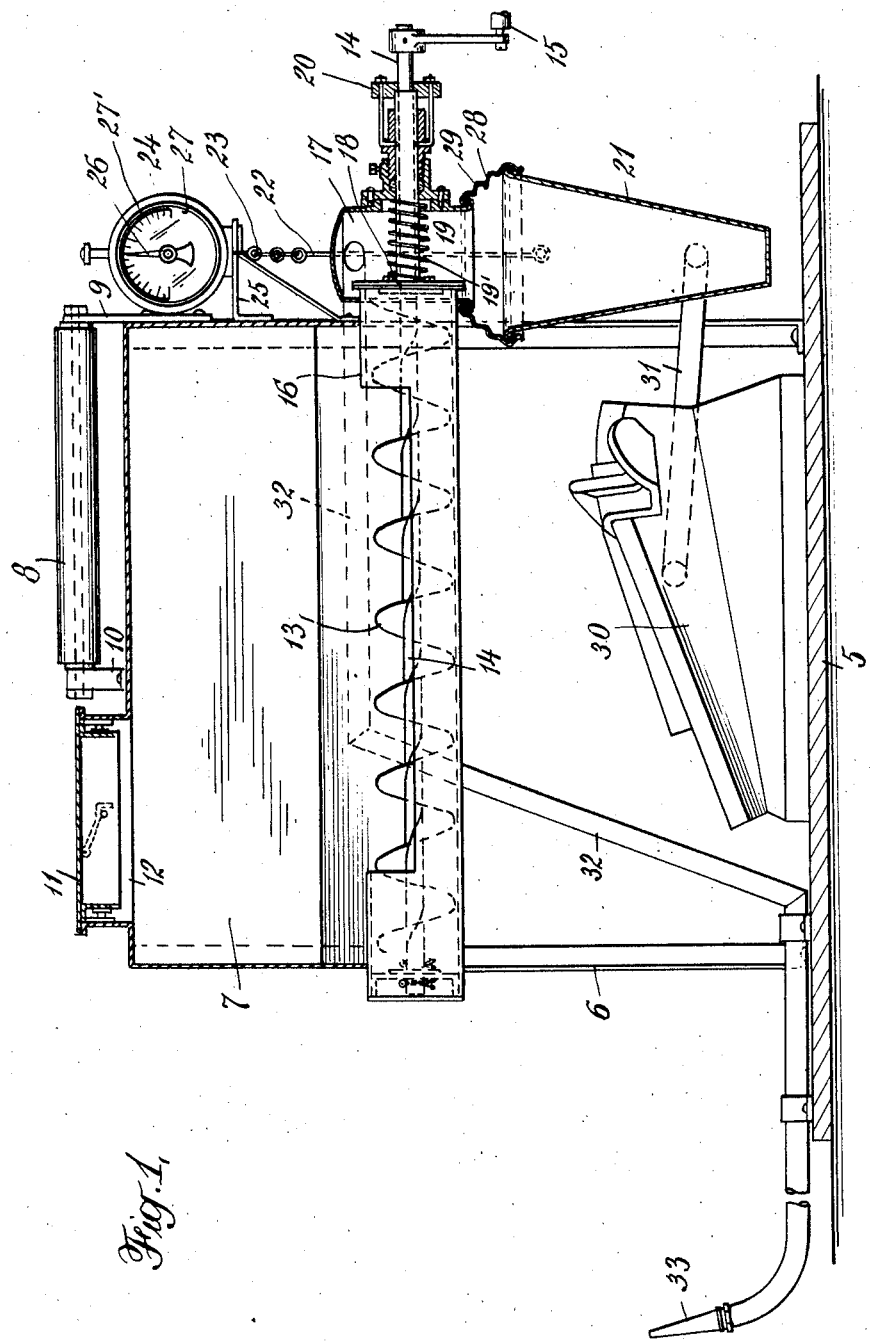

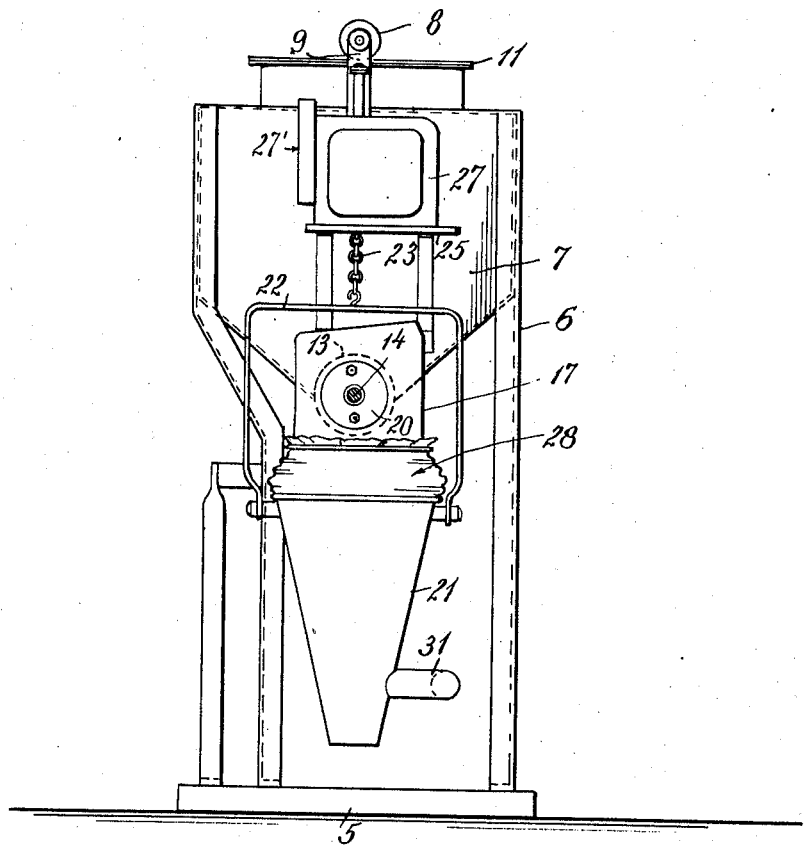

1,593,663

UNITED STATES PATENT OFFICE.

FLOYD J. METZGER, OF NEW YORK, N. Y., AND GEORGE J. WEGERER, OF BELL, CALIFORNIA, ASSIGNORS TO CALIFORNIA CYANIDE COMPANY, INCORPORATED, OF NEW YORK, N. Y., A CORPORATION OF DELAWARE.

APPARATUS FOR FUMIGATION.

Application filed February 11, 1926. Serial No. 87,548.

This invention relates to an apparatus for producing dust clouds, and particularly for distributing finely divided solid materials in the form of clouds in which the solids are suspended in a gaseous medium such as air. The apparatus can be employed in various ways. It is adaptable to the application of solid materials which will decompose in the presence of a gaseous medium such as air and other gases to produce thereby lethal gases capable of destroying animal life.

The use of hydrocyanic acid for fumigation has been known for a long time and various methods of applying it have been developed. Originally the hydrocyanic acid was released within the space to be fumigated by the action of an acid such as sulphuric acid upon a cyanide compound such as sodium cyanide. This method has certain disadvantages such as the necessity of transporting and handling sulphuric acid and the difficulty of disposing of the resulting sludge. More recently fumigation has been conducted with liquid hydrocyanic acid prepared at a central plant and applied either by vaporizing the liquid and introducing the vapor into an enclosure or by spraying the liquid directly into the enclosure. This method also has certain disadvantages, particularly the danger which is inherent in the handling of the volatile and poisonous liquid. The difficulties mentioned can be avoided by the use of a solid cyanide product which decomposes in the presence of a humid atmosphere to release hydrocyanic acid. Such a material is available in the form of calcium cyanide or materials containing this compound. Calcium cyanide is a compound which can be stored safely in closed containers since it does not decompose under such conditions. It is, however, relatively unstable and decomposes rapidly, particularly when it is distributed in the form of dust in the atmosphere of the place to be fumigated. The decomposition releases hydrocyanic acid in copious quantity and the freshly released acid is extremely effective in destroying the animal life.

Calcium cyanide and materials containing calcium cyanide can be utilized in the form of dust to fumigate vegetation such, for example, as the citrus trees of California for the purpose of destroying scale and other insect pests. It can be used also for fumi-
gating ships and buildings to destroy insects
and other animal life. It can be applied, in fact, wherever vermin of any kind exists whether or not the space is enclosed and sealed. To accomplish the purpose most effectively, finely divided material should be distributed uniformly throughout the space to be treated and this is accomplished most readily by applying the dust in the form of a cloud in which the particles are suspended in a gaseous medium such as air or carbon dioxide.

It is the object of the present invention to provide a simple and effective apparatus which is capable of delivering predetermined quantities of the dust in the form of a dust cloud, thus enabling the operator to apply the required quantity of the material to accomplish the desired object.

Other objects and advantages of the invention will be apparent as it is better understood by reference to the following specification and accompanying drawing; in which—

Fig. 1 is a longitudinal section through an apparatus embodying the invention; and Fig. 2 is an end elevation partially in section illustrating the structure shown in Fig. 1.

To carry out the purpose of the invention we provide a receptacle which is adapted to contain a quantity of the finely divided solid material such as calcium cyanide or products containing this compound. We associate with this receptacle means for measuring the predetermined quantities of the solid material, preferably by weight, means for delivering the solid material to the measuring device, and means for ejecting the powdered material in the form of a dust cloud through a suitable nozzle which permits the direction of the dust cloud into the space to be fumigated. In a simple form of the invention a worm conveyer may deliver the powdered material to a receiver which is suspended from a measuring device such as a spring balance having a suitable indicator so that the quantity of material can be accurately and readily determined. A bellows or other device for creating a blast of air is connected to the receiver and a pipe arranged to deliver the dust cloud from the receiver to a suitable nozzle. In place of the bellows, any source of gas under pressure can be employed. A convenient source is a receptacle in which air or carbon dioxide is held under pressure with a regulating valve to permit the escape of the gas under control of the operator.

An apparatus embodying the invention is illustrated in the drawing in which 5 indicates a base to which a frame 6 of light metal construction is secured. The frame supports a receptacle 7 having a carrying handle 8 secured thereto by brackets 9 and 10 so that the apparatus is portable. Of course, the structure could be enlarged and if sufficiently heavy it would be supported upon a wheeled truck so as to facilitate transportation. In practical operations, however, it is desirable to employ an apparatus which can be carried from place to place by the operator. A cover 11 is adapted to be secured in any desired way in the opening 12 at the top of the receptacle. The cover is removable to permit the introduction of the solid material.

A screw conveyer 13 is disposed in the bottom of the receptacle 7 on a shaft 14 which is mounted in suitable bearings and extends through the end of the receptacle and has an operating handle 15 to permit rotation of the shaft and conveyer. When the shaft is rotated the solid material is delivered through one end of a conveyer tube 16 into a housing 17 which communicates therewith. A valve 18 is arranged at the end of the tube 16 and is carried on a sleeve 19 which surrounds the end of the shaft 14. The sleeve 19 is movable endwise upon the shaft against a spring 19' and is controlled by a manually operable ring 20 near the handle 15. The operator is thus enabled to shift the valve 18 to permit delivery of material before the handle 15 is operated and thereafter to close the outlet from the receptacle 7 before air is introduced for the purpose of forming the dust cloud.

A measuring cup 21 is supported by a bail 22 and connecting chain 23 on a spring balance 24 which is mounted on a bracket 25 on the end of the receptacle 7. The spring balance has an indicator 26 and the usual graduations 27' upon the face of a dial 27 cooperating with the indicator 26 to show the amount of solid material which has been delivered to the measuring cup 21. The dial is divided preferably into units based upon the amount of hydrocyanic acid which will be released from a given quantity of the solid material. The apparatus can be used consequently with the aid of a chart to deliver the specified number of units for the fumigation of a space of any dimensions.

The measuring cup 21 is connected to the housing 17 by a collapsible diaphragm 28 which is preferably made of thin rubber with an outer layer 29 of cloth or other material to prevent expansion of the rubber under pressure of the air blast. A bellows 30 of the type commonly used for supplying air blast to gas burners and the like is connected by a flexible pipe 31, also consisting preferably of soft rubber with an outer layer of cloth or other material to prevent expansion of the rubber, to the measuring cup 21. The details of the bellows need not be described since these are well known in the art. The bellows is adapted to deliver a blast of air under a substantial pressure to the measuring cup and consequently to force the finely divided solid material from the cup into the housing 17. A pipe 32 is connected to the upper part of the housing and delivers the dust cloud formed by the air blast to a nozzle 33 which is preferably turned upwardly and is adapted to be inserted, for example, beneath the tent which encloses the space to be fumigated.

In using the apparatus the operator, after inspecting it to see that the various parts are in proper condition, fills the receptacle 7 with the powdered material. The valve 18 is opened then by manipulating the ring 20 and the handle 15 is turned until the desired amount of the powder as indicated on the scale 27 has been delivered to the measuring cup 21. The valve 18 is then closed and the bellows 30 is actuated to introduce a blast of air into the measuring cup. The finely divided solid material is picked up by the blast and forced upwardly into the housing 17 and out through the pipe 32 to the nozzle 33. The finely divided material is ejected from the nozzle in the form of a cloud in which the solid material is suspended in the gaseous medium and with sufficient force to carry the cloud upwardly or in any desired direction for a considerable distance. The cloud of dust may be thus distributed throughout the space which is to be fumigated. Upon contact of the dust with the atmosphere the moisture usually present therein causes the calcium cyanide, if the latter is present in the material used, to decompose, thus releasing hydrocyanic acid, and the latter is effective immediately for the destruction of animal life within the enclosure.

From the foregoing description it will be observed that the apparatus involves a minimum number of relatively simple and inexpensive parts and therefore provides a reliable means for producing a dust cloud for the intended purpose. The apparatus is particularly effective because it permits the application of accurately measured quantities of the fumigating agent. This is essential not only because it ensures the economical application of the relatively expensive fumigating agent but also because in certain types of fumigation, as in the citrus orchards, the trees may be destroyed by an overdose of the fumigant or, on the other hand, the fumigant is ineffective if the proper dosage is not applied. In the present apparatus the quantity of material in each charge can be read with accuracy on the dial of the spring balance and consequently the application of the right amount of the fumigant is easily accomplished.

Various changes can be made in the details of the structure as described without departing from the invention or sacrificing any of the advantages thereof.

We claim:—

1. A dusting apparatus comprising a receptacle for finely divided material and means for withdrawing a portion of the material, means for weighing the portion withdrawn and means for discharging that portion of the material as a dust cloud.

2. A dusting apparatus comprising a receptacle for finely divided material, a measuring cup, means for delivering the material from the receptacle to the cup, means to determine the quantity of material so delivered and means for discharging the material as a dust cloud.

3. A dusting apparatus comprising a receptacle for finely divided material, a measuring cup, means for delivering the material from the receptacle to the cup, means for weighing the material in the cup and means for discharging the material as a dust cloud.

4. A dusting apparatus comprising a receptacle for finely divided material, means to receive a portion of the material from the receptacle, means for weighing the portion received and means for directing a blast of gas through that portion and for discharging it as a dust cloud.

5. A dusting apparatus comprising means to receive a charge of finely divided material, means for weighing the charge, and means for directing a blast of gas through the charge and for discharging it as a dust cloud.

6. A dusting apparatus comprising means for weighing a charge of finely divided material and means for directing a blast of gas through the charge and for discharging it as a dust cloud.

7. A dusting apparatus comprising nozzle means for directing a finely divided material suspended in air as a dust cloud, means to weigh the charge of material and means to deliver a blast of air through the material and to convey it to the nozzle.

8. A dusting apparatus comprising a receptable for finely divided material, weighing means, a measuring cup movably supported on the receptacle and connected to the weighing means, an air-tight connection between the weighing cup and receptacle, means for moving material from the receptacle to the weighing cup and means for introducing a blast of air to the weighing cup and for conveying the material as a dust cloud therefrom.

9. A dusting apparatus comprising a receptacle for finely divided material, weighing means, a measuring cup movably supported on the receptacle and connected to the weighing means, an air-tight connection between the weighing cup and receptacle, means for moving material from the receptacle to the weighing cup, means for preventing the air blast from entering the receptacle, and means for introducing a blast of air to the weighing cup and for conveying the material as a dust cloud therefrom.

10. A dusting apparatus comprising a receptacle for finely divided material, weighing means, a measuring cup movably supported on the receptacle and connected to the weighing means, an air-tight connection between the weighing cup and receptacle, manually operable means for moving material from the receptacle to the weighing cup, and means for introducing a blast of air to the weighing cup and for conveying the material as a dust cloud therefrom.

11. A dusting apparatus comprising a receptacle for finely divided material, weighing means, a measuring cup movably supported on the receptacle and connected to the weighing means, an air-tight connection between the weighing cup and receptacle, means for moving material from the receptacle to the weighing cup, manually adjustable means for preventing the air blast from entering the receptacle, and means for introducing a blast of air to the weighing cup to convey the material as a dust cloud therefrom.

In testimony whereof we affix our signatures.

FLOYD J. METZGER.
GEORGE J. WEGERER.